(12) United States Patent
Kazi et al.

(10) Patent No.: US 9,712,473 B2
(45) Date of Patent: Jul. 18, 2017

(54) METHODS, SYSTEMS, AND USER INTERFACES FOR COMMUNITY-BASED LOCATION RATINGS

(71) Applicant: FACEBOOK, INC., Menlo Park, CA (US)

(72) Inventors: Rousseau Kazi, Moreno Valley, CA (US); Jonathan McCord, Mountain View, CA (US)

(73) Assignee: FACEBOOK, INC., Menlo Park, CA (US)

( * ) Notice: Subject to any disclaimer, the term of this patent is extended or adjusted under 35 U.S.C. 154(b) by 992 days.

(21) Appl. No.: 13/940,063

(22) Filed: Jul. 11, 2013

(65) Prior Publication Data

US 2015/0019651 A1 Jan. 15, 2015

(51) Int. Cl.
*G06F 15/16* (2006.01)
*H04L 12/58* (2006.01)

(52) U.S. Cl.
CPC .............. *H04L 51/20* (2013.01); *H04L 51/32* (2013.01)

(58) Field of Classification Search
CPC ................................ H04L 51/20; H04L 51/32
USPC ........ 709/202–205, 223–224, 250, 225–226; 707/748
See application file for complete search history.

(56) References Cited

U.S. PATENT DOCUMENTS

| 7,117,265 B2 * | 10/2006 | Hamasaki | H04L 67/04 709/204 |
| 9,071,579 B1 * | 6/2015 | Bender | H04L 51/32 |
| 2010/0306249 A1 * | 12/2010 | Hill | G06Q 50/01 707/769 |
| 2010/0318551 A1 * | 12/2010 | Lai | G06F 17/30867 707/765 |
| 2012/0254186 A1 * | 10/2012 | Winner | G06F 17/3087 707/740 |
| 2013/0014046 A1 * | 1/2013 | Watts | G06F 17/30864 715/772 |
| 2013/0073389 A1 * | 3/2013 | Heath | G06Q 50/01 709/204 |
| 2015/0186958 A1 * | 7/2015 | Jackson | G06Q 30/0282 705/347 |

* cited by examiner

*Primary Examiner* — Bharat N Barot
(74) *Attorney, Agent, or Firm* — Nicholson De Vos Webster & Elliott LLP (57) ABSTRACT

Methods, system, and user interfaces for providing a user interface enabling community-based map functionalities for users of a social networking system are described. One method includes providing a user interface (UI) that includes a geographic map portion and a rating portion. The geographic map portion depicts a geographic area and includes a set of location identifiers, and the rating portion includes a set of rating list elements. Each rating list element includes a rating input UI element allowing the user to rate a location that the social networking system has determined that the user has visited. The method also includes receiving a first rating for a first location, which is generated through use of the rating portion. The method further includes, responsive to said receiving of the first rating, modifying the user interface to indicate that the first rating was received.

26 Claims, 9 Drawing Sheets

METHODS, SYSTEMS, AND USER INTERFACES FOR COMMUNITY-BASED LOCATION RATINGS

FIELD

Embodiments of the invention relate to social networking; and more specifically, to methods, systems, and user interfaces for community-based maps.

BACKGROUND

Most user interfaces, and in particular user interfaces of online social networking systems, are designed to prevent users from making mistakes. Additionally, these user interfaces are also designed to provide feedback to its users when they have done something wrong, such as inputting incorrect passwords or providing improperly formatted input values. However, many such user interfaces completely fail to provide positive feedback to its users to reinforce desired user behavior.

Additionally, designers of social networking systems often struggle to determine ways to encourage its users to provide contributions and data that can drastically improve the usefulness of the system as a whole.

These problems are only magnified in the context of providing online geographic maps, which may include outdated, incomplete, and inaccurate information.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details are set forth. However, it is understood that embodiments of the invention may be practiced without these specific details. References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Detailed below are embodiments of methods, systems, and user interfaces for community-based map functionalities for users of a social networking system. These user interfaces allow users to receive instant feedback that their ratings are being entered into the social networking system, and further enable the social networking system to easily seek such ratings from the users based upon locations that the social networking system has determined that the user has visited, which therefore removes the burden for users to remember which locations they have visited and manually enter ratings for those locations. These methods, systems, and user interfaces utilize both publicly available information as well as information provided by users of the social networking system. However, all use of information provided by users of the social networking system is explicitly subject to all privacy settings of the involved users and the privacy policy of the social networking system.

A social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system. For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). For example, in response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user. A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept. An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social networking system a request to create an edge between a user node of the user and a concept node of the concept, indicating a relationship between the user and the concept (e.g., the user checks in a restaurant, or the user "likes" a celebrity, etc.). For example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia files to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similarly to events, the calendar entries may include times, dates, locations and identities of other users.

Figure 1:
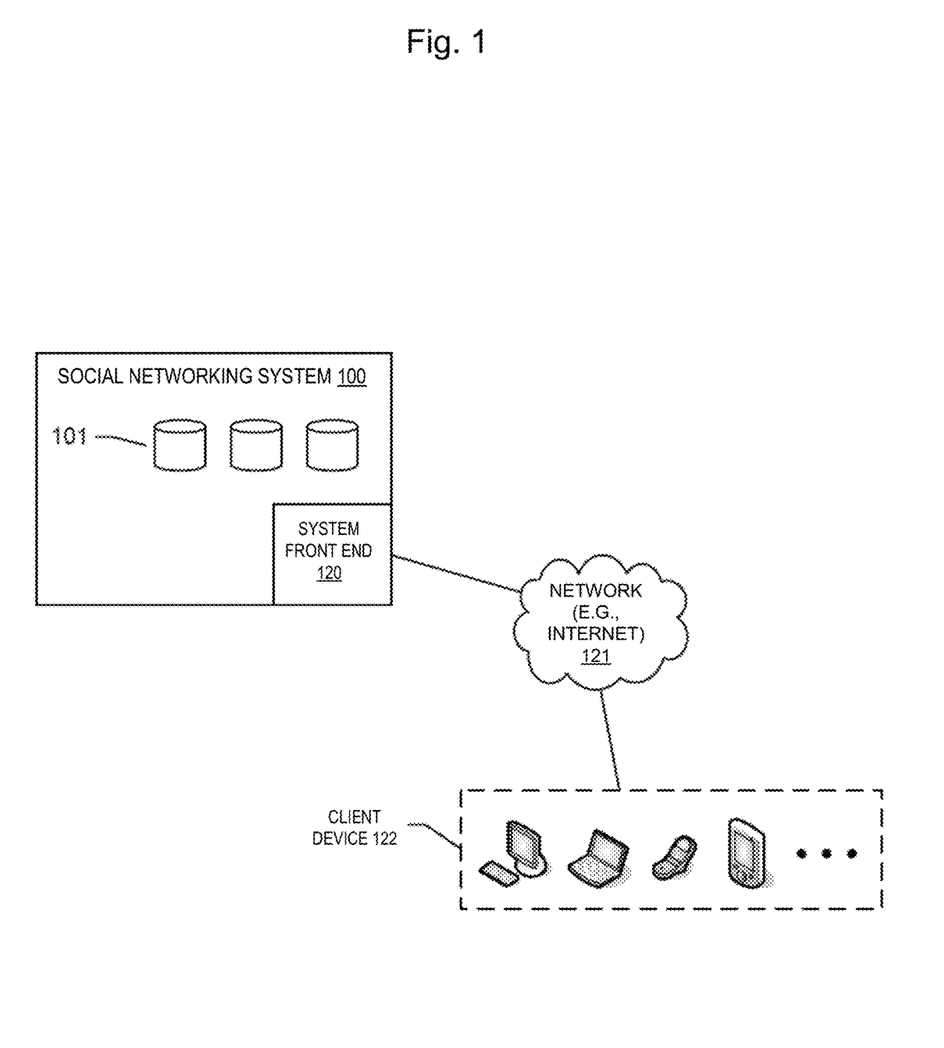
FIG. 1 is an example network environment of a social networking system according to an embodiment of the invention.

FIG. 1 illustrates an example network environment of a social networking system. In particular embodiments, a social networking system 100 may comprise one or more data stores 101. For example, each data store 101 may comprise one or more mass storage devices. In particular embodiments, the social networking system 100 may store in data stores 101 a social graph comprising user nodes, concept nodes, and edges between nodes as described earlier. Each user node may comprise one or more data objects corresponding to information associated with or describing a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In particular embodiments, the social networking system 100 may comprise one or more computing devices (e.g., servers) hosting functionality directed to operation of the social networking system. In particular embodiments, one or more of data stores 101 may be operably connected to the social networking system's front end 120. A user of the social networking system 100 may access the social networking system 100 using a client device such as client device 122. In particular embodiments, front end 120 may interact with client device 122 through network 121. For example, front end 120 may be implemented in software programs hosted by one or more computing devices of the social networking system 100. Front end 120 may include web or Hypertext Transfer Protocol (HTTP) server functionality, as well as other functionality, to allow users to access the social networking system 100. Client device 122 may be a desktop computer, laptop computer, tablet computer, personal digital assistant (PDA), in- or out-of-car navigation system, smart phone or other cellular or mobile phone, or mobile gaming device, among other suitable computing devices.

Client device 122 may execute one or more client applications, such as a web browser (e.g., Microsoft Windows Internet Explorer, Mozilla Firefox, Apple Safari, Google Chrome, Opera, etc.) or special-purpose client application (e.g., Facebook for iPhone or iPad, Facebook for Android, etc.), to access and view content over a computer network 121.

Network 121 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 122 may access the social network system 100.

In particular embodiments, the social networking system 100 may store in data stores 101 data associated with applications and services provided by the social networking system 100. In particular embodiments, the social networking system 100 may store user event data in data stores 101. For example, a user may register a new event by accessing a client application to define an event name, a time and a location, and cause the newly created event to be stored (e.g., as a concept node) in data stores 101. For example, a user may register with an existing event by accessing a client application to confirming attending the event, and cause the confirmation to be stored in data stores 101. For example, the social networking system 100 may store the confirmation by creating an edge in a social graph between a user node corresponding to the user and a concept node corresponding to the event, and store the edge in data stores 101. As another example, the social networking system 100 may store location information describing locations such as (but not limited to) cities, parks, buildings, parks, companies, organizations, restaurants, markets, tourist attractions, stores, cafes, etc. These locations may be stored as concept nodes in the social graph or as entirely separate data structures. This location information may include pictures of the location, contact information for the location (including but not limited to addresses, phone numbers, email addresses, online profile account names, names of employees, etc.), and ratings of the location from users of the social networking system 100 or from other entities. The ratings may include numeric ratings (e.g., a number rating between 0-100, a 0-5 "star" rating, or the like), text-based ratings (e.g., written descriptions of some aspect of the location), or even multimedia ratings including audio and/or visual content (including, but not limited to, photographs of the location, an audio recording of the location or of a user describing the location, videos recorded at or near the location or of people describing the location, etc.).

Figure 2:
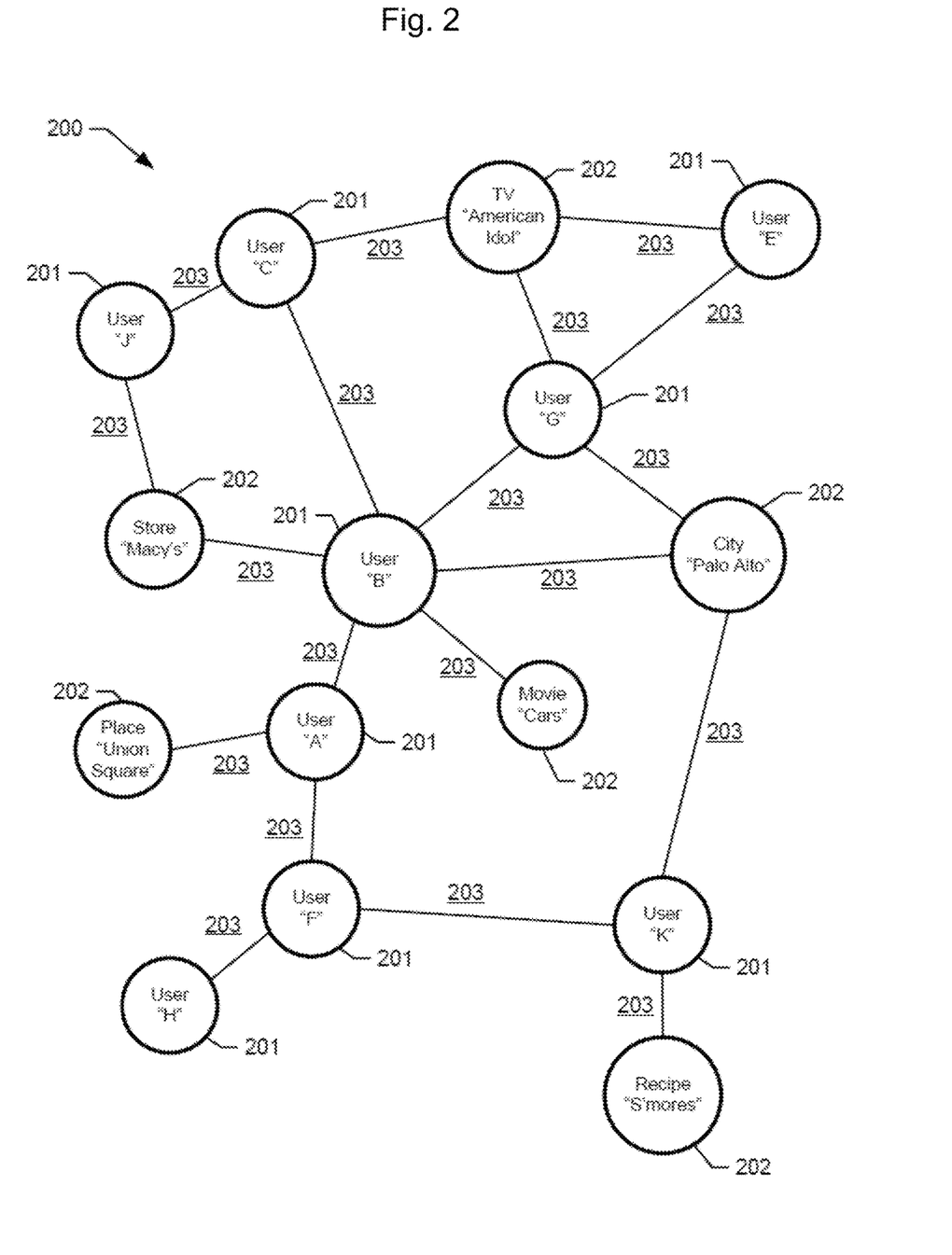
FIG. 2 is a diagram of an example social graph according to an embodiment of the invention.

FIG. 2 illustrates an example social graph 200 that may be used by a social networking system 100. In the example of FIG. 2, social graph 200 includes user nodes 201, concept nodes 202, and edges 203 between nodes. An edge 203 between a pair of nodes may represent a relationship (or an action) between the pair of nodes. For example, user "G" is a friend of user "B", user "C", and user "E", respectively, as illustrated by the edges between user nodes "G" and "B", between user nodes "G" and "C", and between user nodes "G" and "E." For example, users "C", "E", and G" watch (or "like") a TV show "American Idol", as illustrated by the edges between the "American Idol" concept node and user nodes "C", "E", and G", respectively. Similarly, the edge between the user node "B" and the concept node "Palo Alto" may indicate that user "B" declares "Palo Alto" as his or her city of residence. The edge between the user node "B" and the concept node "Macy's" may indicate that user "B" likes the store "Macy's." Of course, social graphs can be much larger than social graph 200 illustrated in FIG. 2, and the number of edges and/or nodes in a social graph may be many orders of magnitude larger than that depicted herein.

As described earlier, an edge between a pair of nodes may indicate a direct relationship between the pair of nodes. An edge may be directed and connect an ordered pair of nodes. For example, an edge connecting a user node corresponding to a user and a concept node corresponding to a city may be directed (i.e., the user lives in the city). An edge may be undirected, as a pair of nodes connected by the edge does not have a particular order. For example, an edge connecting two user nodes can be undirected as the edge indicates a friendship between two users corresponding to the two user nodes. As described earlier herein, a degree of separation between any two nodes is defined as the minimum number of hops required to traverse the social graph from one node to the other. Thus, for user "B", the nodes for users "A", "C", and "G" are all one hop away and are thus users of first-degree and may be described as "connected to" or "friends" of user "B." However, from the standpoint of user "B", the nodes for users "E", "F", "J", and "K" are considered to have a second-degree of separation because the shortest path from user "B" to any of these nodes requires transiting through one other node. Thus, from the standpoint of user "B", users "E", "F", "J", and "K" are deemed "friends of friends." Accordingly, user "B" is either a "friend" or a "friend of a friend" with every other user in the graph except for user "H", as the shortest path between user "B" and user "H" transits through two user nodes.

Figure 3:
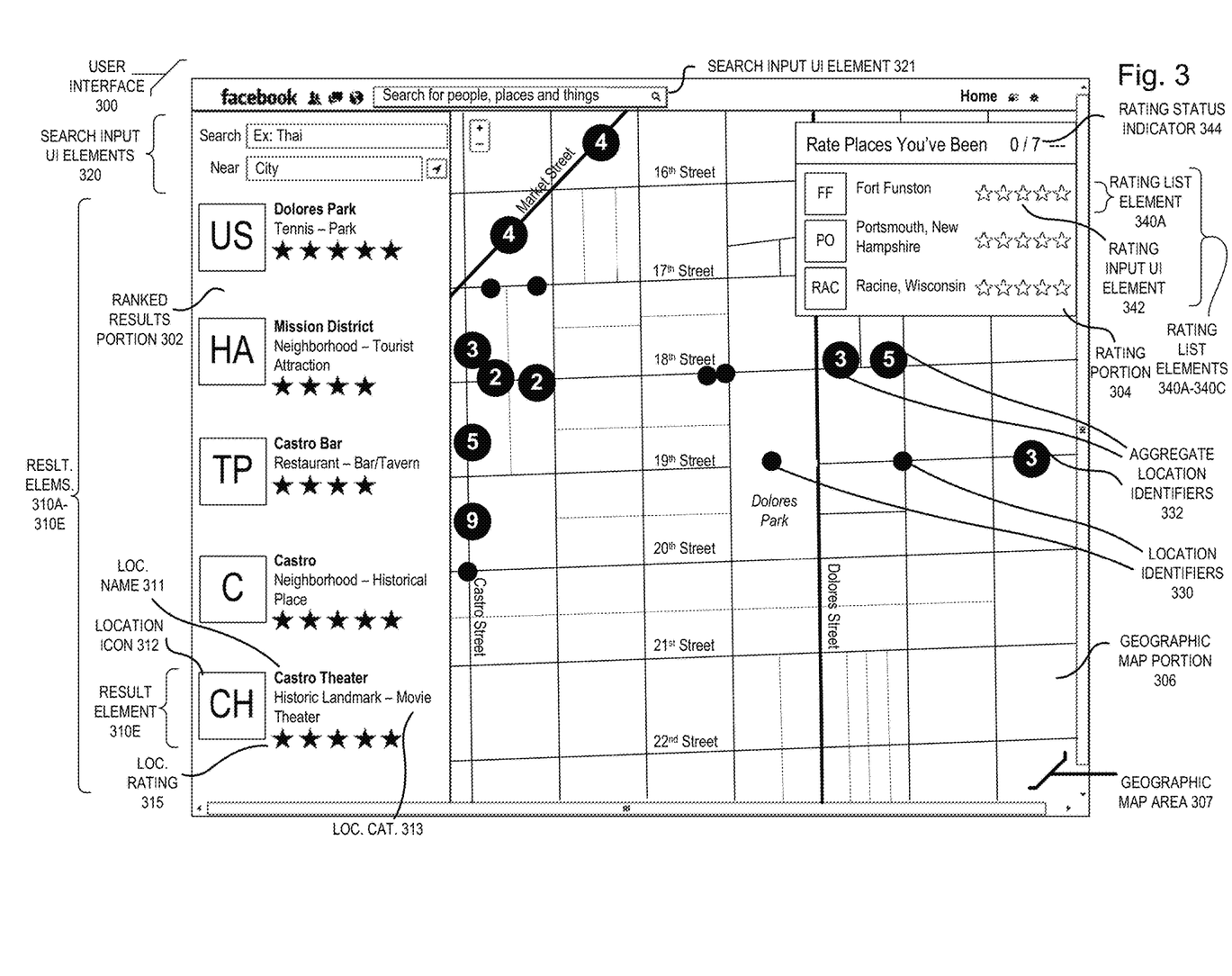
FIG. 3 is a diagram of an example community-based maps user interface including a geographic map portion, a rating portion, and a ranked results portion according to an embodiment of the invention.

FIG. 3 is a diagram of an example community-based maps user interface 300 including a geographic map portion 306, a rating portion 304, and a ranked results portion 302 according to an embodiment of the invention. In the depicted embodiment, the geographic map portion 306 of the user interface 300 displays a geographic map area 307 representing a small portion of the city of San Francisco. However, in other embodiments the geographic map area 307 represents portions of (or all of) other cities, states, countries, land, bodies of water, planets, areas of space, buildings, etc. The geographic map area 307 of the geographic map portion 306, in some embodiments, changes based upon an action of a user. For example, using any number of commands or gestures, including but not limited to clicking on a zoom in or zoom out button, clicking on an aggregate location identifier, scrolling a mouse wheel, using a pinch or expand gesture, typing a keyboard key or keys, etc., the user may "zoom in" the geographic map area 307 to view a smaller geographic range (optionally with increased detail), and/or the user may "zoom out" the geographic map area 307 to view a larger geographic range (optionally with less detail). The geographic map area 307 may be initially generated to include a current position of the user device of the user, or may be initially generated to include a previous position of the user device.

The depicted geographic map portion 306 includes multiple location identifiers 330 representing individual locations such as cities, parks, buildings, parks, companies, organizations, restaurants, markets, tourist attractions, stores, cafes, etc. In the depicted embodiment, the location identifiers 330 are small circle icons, but in other embodiments they can be other icons, graphics, text, etc. The depicted geographic map portion 306 also includes aggregate location identifiers 332, which are illustrated as circles with a number in the middle of each that represents a number of individual location identifiers that would be located within or near the aggregate location identifier. In some embodiments, when a user "zooms" in on the geographic map portion 306 one or more of the aggregate location identifiers are each replaced by several individual location identifiers (e.g., 330), assuming the area encompassing the particular aggregate location identifier 332 is still within the "zoomed in" geographic map area (e.g., 307).

The location identifiers 330, in certain embodiments, may include a set of location identifiers from a curated list created and/or managed by a particular organization or user. In some of these embodiments, each user may view these curated lists and, upon selecting one curated list, include the location identifiers from the list within that user's geographic map portion 306. In certain embodiments, these location identifiers from curated lists may be represented differently (e.g., with different icons) than the other location identifiers, and a location profile (to be illustrated later herein with respect to FIG. 7) may include an attribution (e.g., text, link, image, etc.) to the organization or user that created and/or managed that curated list. In certain embodiments, the curated lists also include ratings of the locations made by that particular organization or user.

The user interface 300 of FIG. 3 also includes a rating portion 304 that enables a user to provide a rating or ratings for locations that the user is determined to have visited and allows for such ratings to be submitted to the social networking system by the user. The depicted rating portion 304 includes three depicted rating list elements 340A-340C, though other embodiments may include more, fewer, or none. In the depicted embodiment, the rating portion includes rating list elements 340A-340C for the locations "Fort Funston", "Portsmouth, N.H.", and "Racine, Wis.". Additionally, a rating status indicator 344 indicates that there are a total of seven locations that the social networking system has determined that the user has visited. This rating status indicator 344 ("0/7") indicates that of the seven locations that the social networking system has determined that the user has visited, the user has provided rating information for none of them. The social networking system, depending upon the embodiment of the invention, determines locations that the user has visited according to one or more determination methods. In various embodiments of the invention, determination methods for detecting a geographic location of a user of the social networking system may include one or more of utilizing HyperText Markup Language version 5 (HTML5) geolocation code within an HTML5 document displayed to a user, using JavaScript code or another set of instructions to execute on a user device that is configured to report a geolocation of the user device of the user to the social networking system, receiving a location name or identifier explicitly entered by the user, detecting a location within metadata of a multimedia document uploaded to the social networking system (or an associated system) by the user or contacts of the user, detecting a location based upon text sent to the social networking system from the user that does not explicitly include the location name, detecting that the user is identified (i.e. "tagged") within a multimedia document (e.g., photograph, video recording, audio recording, etc.) provided to the social networking system that is associated with a location, receiving a "check in" from a user indicating a location that the user is located at, etc.

In the depicted embodiment of FIG. 3, a rating list element (e.g., 340A) includes a location icon, a location name, and a rating input user interface (UI) element 342, though other embodiments contain more or fewer elements. In this embodiment, the rating input UI element 342 is a group of star icons. The user may select a star icon of each group to provide a rating—for example, if the user clicks on the fourth star icon of the five star icons, a rating of "4" is provided to the social networking system indicating that the user thinks the location is worthy of four out of five possible stars. In other embodiments, of course, the icons are not stars (e.g., diamonds, check marks, "thumbs up", etc.), and in some embodiments there may be more or fewer icons (e.g., four, ten, etc.) allowing users to provide ratings with more or less granularity. Upon the user providing such a rating using the rating input UI element 342, the rating may be transmitted from the user device to the social networking system.

In some embodiments of the invention when all of the rating list elements 340A-340C for the determined locations have been rated by the user, the rating portion 304 is configured to prompt the user to answer particular questions seeking location-based answers. For example, the questions may involve asking the user for her input about the "best" location in an area for a particular good, service, or experience. For example, the user could be asked what the best place for ice cream in their city is, where the best park in the city is to play tennis, or where the best scenic view of downtown is. In some embodiments, the rating portion 304 may be configured to provide such prompts even when all of the rating list elements have not been rated.

In other embodiments, upon completion of the ratings for the rating list elements 340A-340C, the rating portion 304 is configured to ask the user for additional descriptive information about previous locations that the user has already rated. For example, the user may be asked to confirm factual information about a location, or may be asked for a more detailed review of the location. Similarly, in other embodiments this configuration may also occur even without all of the ratings having been completed.

The depicted embodiment of FIG. 3 also includes a ranked results portion 302 of the user interface 300 that presents a set of one or more result elements 310A-310E based upon the current scale of the geographic map area 307 and/or a set of search terms and/or operators entered into a set of search input UI elements 320 and/or search input UI element 321. While FIG. 3 illustrates five result elements 310A-310E, this embodiment or other embodiments may include a different number of result elements based upon these search terms and the current scale of the geographic map area 307. The depicted set of search input UI elements 320 includes a search input box allowing text input form the user and a "near" input box allowing a geographic indication (e.g., city, state, neighborhood, etc.) of an area to be searched. Additionally, a "current location" button is included within the set of search input UI elements 320, which in embodiments of the invention will populate the "near" input box with a geographic indication (e.g., a coordinate, a latitude-longitude pairing, etc.) of the user device. Upon the user utilizing the set of search input UI elements 320, the set of result elements 310A-310E may be updated to reveal search results (i.e. result elements matching the data entered into the search input UI elements 320), and in some embodiments, depending upon the search results, the geographic map area 307 may be moved or zoomed (an increase or decrease in scale) to reveal one or more location of the result elements 310A-310E. In some embodiments of the invention, the user may perform the same types of search utilizing the search input UI element 321 of a banner not directly within the ranked results portion 302 of the user interface 300. In certain embodiments, a user may move (e.g., pan, scan, etc.) the geographic map area 307 to update the ranked results portion 302 accordingly. In some embodiments, when the user moves the geographic map area 307, perhaps by dragging the map itself or by utilizing control buttons associated with the map, a new search is executed using whatever text may exist within the search input UI elements 320 along with the geographic coordinates presented by the current view of the geographic map area 307.

In an embodiment of the invention, the displayed result elements 310A-310E are sorted according to a number of ratings for each result element. For example, a set of search results may be ordered according to a gross number of ratings each search result by all users of the social networking system. In some such embodiments, the location with the most number of ratings is displayed as the first result element (e.g., 310A), the location with the second most number of ratings is displayed as the second result element (e.g., 310B), etc. In other such embodiments, the location with the most ratings from first-degree connected users (i.e. "friends") are displayed first (or from first-degree connected and second-degree connected users), while in other embodiments the location with the highest average rating value from "friends" of the user, "friends" and "friends-of-friends" of the user, or from all users of the social networking system that have rated that location.

In an embodiment of the invention, a result element (e.g. 310E) represents one location that located within the current geographic map area 307, and includes a location icon 312 (herein depicted as a square with one or more letters, but in certain embodiments includes a photograph, animation, illustration, or similar). The result element 310E also includes a location name 311 for the location, one or more location categories 313 describing the location, and a location rating 315 representing a rating of the location. In certain embodiments of the invention, the location rating 315 is based upon ratings from a plurality of users of the social networking system (e.g., an average rating value, a median rating value, a mode rating value, etc.). In some embodiments, this plurality of users is all users of the social networking system that have rated that particular location, but in other embodiments the plurality of users is limited to one or more of first-order connected users (i.e. "friends") of the user and second-order connected users (i.e. "friends of friends") of the user.

In those embodiments where the location rating 315 appears differently for different users (e.g., the location rating 315 is based upon ratings from a user's friends and friends-of-friends), the social networking system may be configured to transmit to a person or organization affiliated with a location, a breakdown of how the users of the social networking system view the rating for that location. For example, the social networking system may transmit information to an owner of a restaurant detailing that 32% of users will view his restaurant as "5 stars", 55% of users will view his restaurant as "4 stars", and 13% of users will view his restaurant as "3 stars" or below. Further, in some embodiments, the social networking system is able to be configured to provide custom content (e.g., an advertisement or coupon) to particular users (e.g., within a city, within an age range, etc.) that view a particular location at a particular rating level. For example, all users that view a restaurant at "2 stars" may be shown an advertisement, and users that live in a particular city and view a coffeehouse as "4 or 5 stars" may be shown a coupon.

In some embodiments of the invention, location ratings 315 are adjusted for search and recommendation purposes. In an embodiment, the social networking system computes a similarly coefficient between the user and another user that provided a rating for a location. This similarity coefficient may be computed in a variety of ways, and in an embodiment the computation is based upon one or more of a similarly of the places that each user has been determined to have visited and a similarity of the rating values each of these users submitted for these locations. Using this user-to-user similarity coefficient, the ratings from the other user may be adjusted to weight ratings from "similar" users more strongly than those ratings from not as similar of users.

The social networking system, in an embodiment, is configured to determine the particular types of location that the user is determined to have visited. Using this kind of data for a plurality of users in the social networking system (e.g., all users located within a particular city), the social networking system can compute a mean and/or standard deviation of an amount of visits to a particular type of location for these users. Then, if the user exceeds a particular number of standard deviations from the mean (e.g., 2 standard deviations), the user may be deemed by the social networking system to be an "expert" regarding this type of location. For example, a type of location may include "coffee shop", "Mexican restaurant", "yoga studio", or "dog park." In other embodiments, instead of determining such statistics regarding visits to a type of location, the statistics are determined based upon the number of ratings a user has provided for a type of location. In some embodiments, the social networking system may display to a plurality of users that the user is an "expert" with respect to a particular category or type of location, or may weight that user's ratings more strongly when processing location search requests, as described above.

Figure 4:
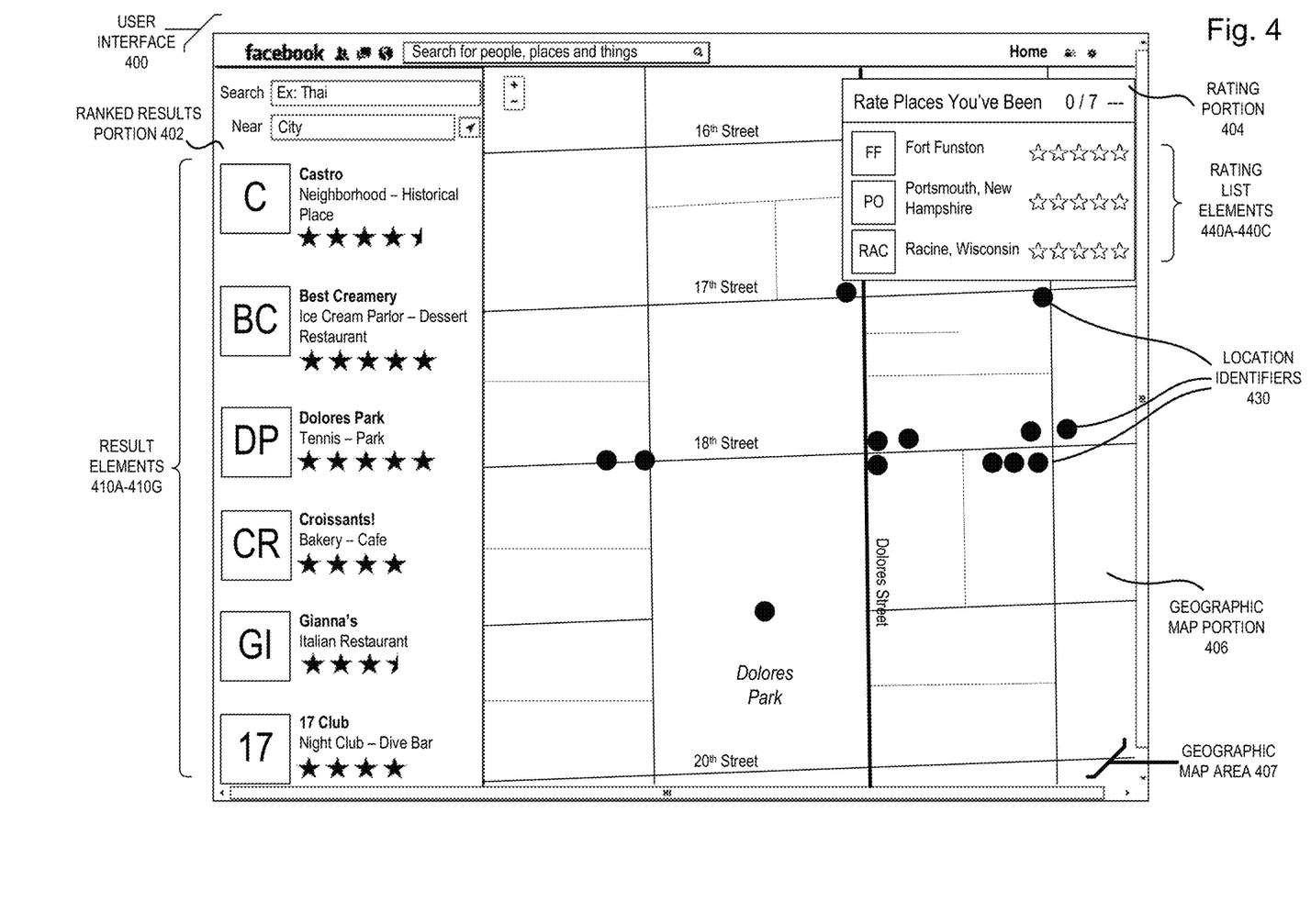
FIG. 4 is a diagram illustrating the user interface of FIG. 3 zoomed to a larger scale according to an embodiment of the invention.

FIG. 4 is a diagram illustrating the user interface of FIG. 3 zoomed to a larger scale according to an embodiment of the invention. Similar to the embodiment of FIG. 3, the user interface 400 of FIG. 4 includes a ranked results portion 402 with a set of result elements 410A-410G, a rating portion 404 including a set of rating list elements 440A-440C, and a geographic map portion 406. In an embodiment of the invention, the geographic map area 407 presents a larger scale view illustrating a portion of the geographic map area 307 of FIG. 3 in response to one of the user selecting one of the result elements 310A-310E (e.g., the "Dolores Park" result element 310A), the user selecting one of the aggregate location identifiers 332, the user "zooming in" by using a zoom element of the user interface 300 or by a single-touch or multi-touch gesture (e.g., "pinch zoom") or by the use of a scroll wheel of a mouse, etc. At the geographic map area 407 scale illustrated in FIG. 4, two aggregate location identifiers 332 of FIG. 3 ("5" and "3", located on "18$^{th}$ Street" near "Dolores Street") have been replaced with the respective number of individual location identifiers 430. For example, the aggregate location identifier 332 of "5" has been replaced with the five different individual location identifiers 430 that it represented, and the aggregate location identifier 332 of "3" (closer to the intersection of "18$^{th}$ Street" and "Dolores Street") has similarly been replaced with the three different individual location identifiers 430 that it represented.

In the depicted embodiment of the invention, the set of result elements 410A-410G is different than the set of result elements 310A-310E of FIG. 3 responsive to the change of the geographic map area 407. Accordingly, in this embodiment, the set of result elements 410A-410G includes result elements for locations that are located within the new geographic map area 407.

Figure 5:
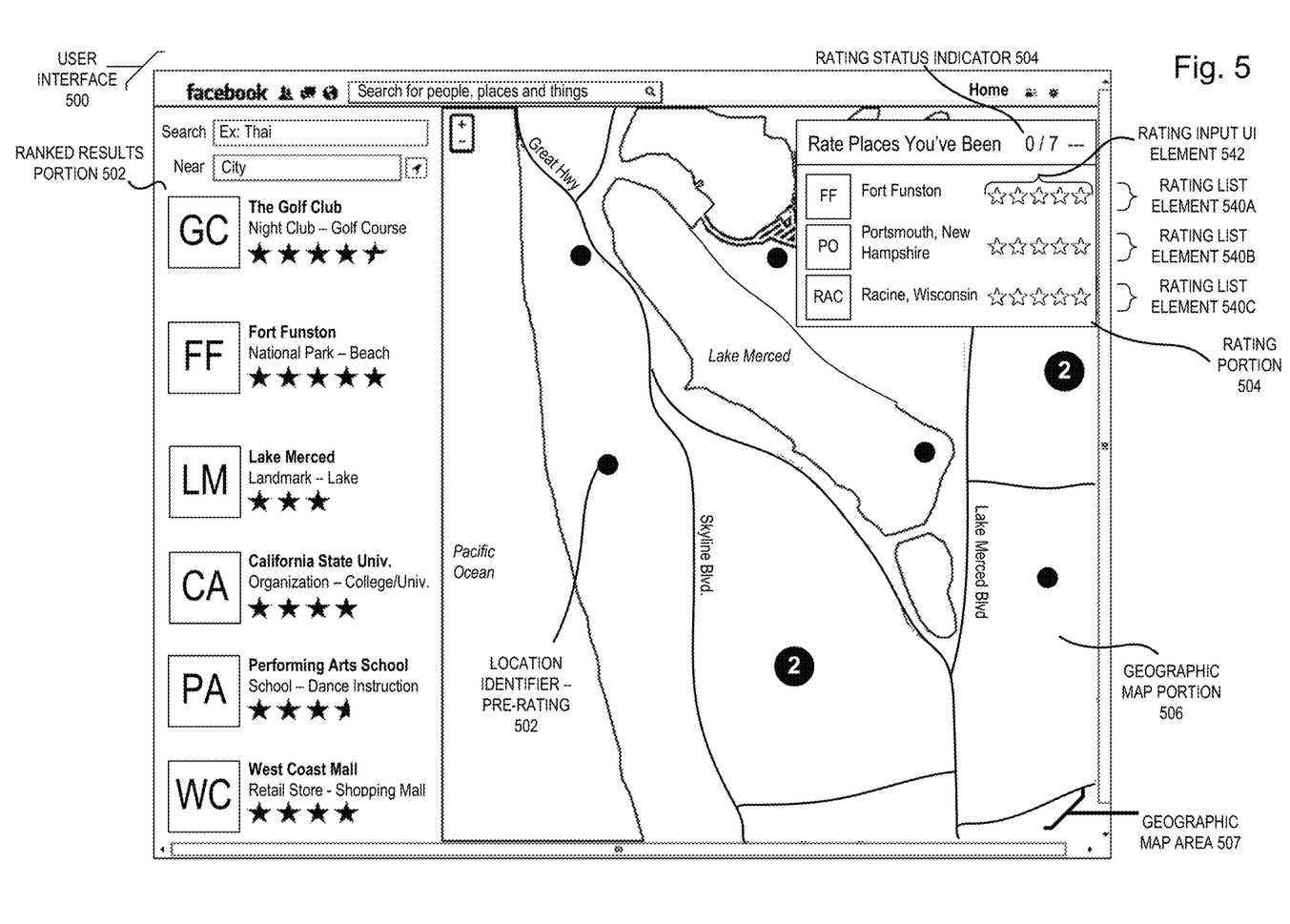
FIG. 5 is a diagram illustrating a community-based maps user interface before a rating is generated using the rating portion of the user interface according to an embodiment of the invention.

FIG. 5 is a diagram illustrating a community-based maps user interface before a rating is generated using the rating portion 504 of the user interface 500 according to an embodiment of the invention. This user interface 500, similar to the user interfaces of the other figures, includes a ranked results portion 502 including a set of result elements for locations within the geographic map area 507, a geographic map portion 506, and a rating portion 504. The geographic map area 507 of the geographic map portion 506 illustrates another portion of the city of San Francisco, and includes both individual location identifiers and also aggregate location identifiers.

One of the individual "pre-rating" location identifier 502 is identified in FIG. 5 that represents a location that will be rated by the user using the rating input UI element 542 of a first rating list element 540A for "Fort Funston". (The rating portion 504 also includes two other rating list elements 540B-540C, which happen to be for two different locations that are cities.) In this depicted embodiment, a location identifier 502 already exists for the location before the user has provided a rating for it; in other embodiments, there is no location identifier 502 for the location before the user provides such a rating, and is added upon the user submitting a rating for that location. At the illustrated point in time, before the user has provided a rating for the "Fort Funston" location, the rating status indicator 504 indicates that the user has rated zero of the seven determined user-visited locations. In this embodiment, the user will provide a rating between one star and five stars using the rating input UI element 542 by clicking upon a corresponding star icon that represents the user's rating.

Figure 6:
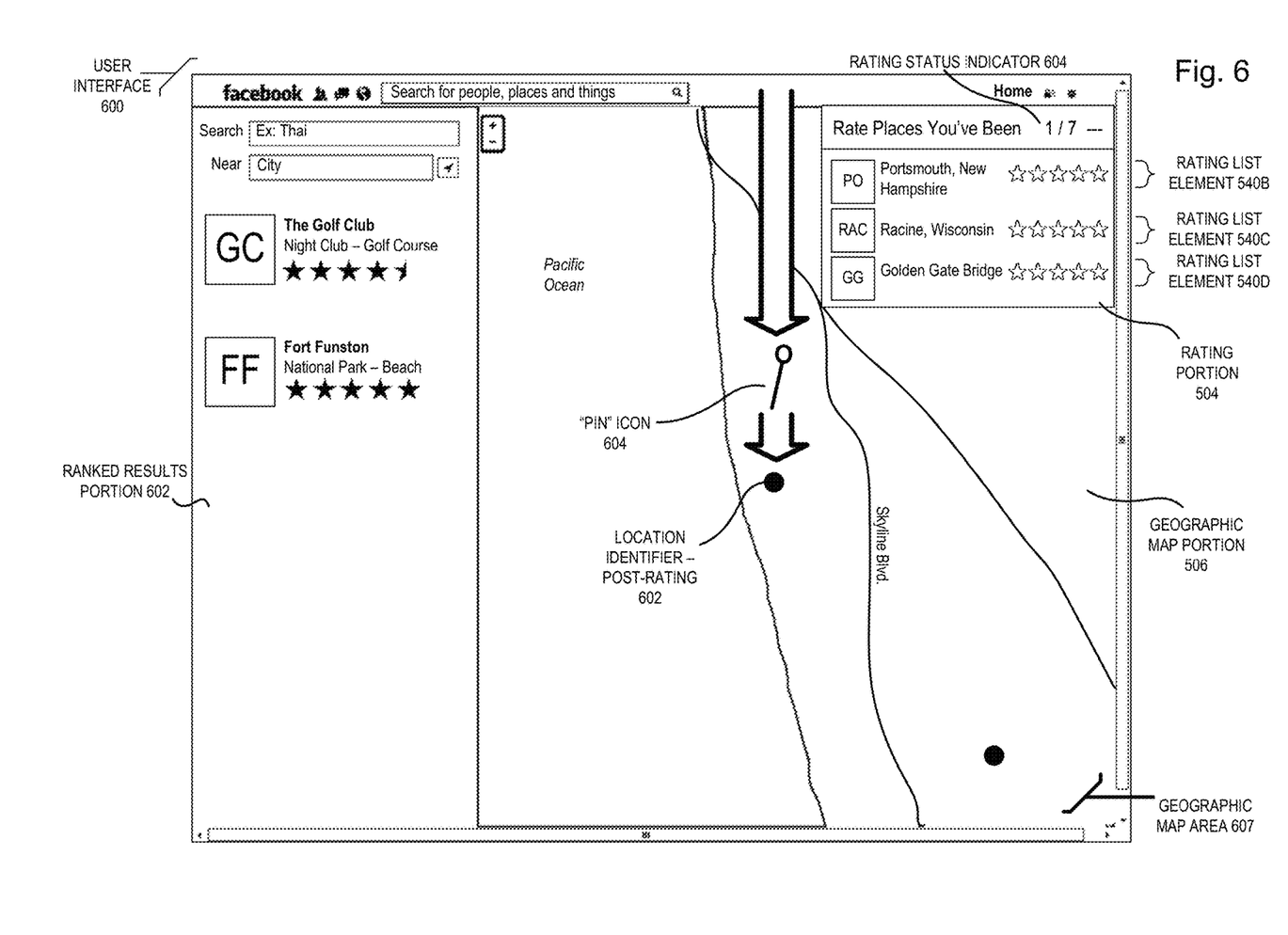
FIG. 6 is a diagram illustrating the user interface of FIG. 5 after the rating is generated according to an embodiment of the invention.

FIG. 6 is a diagram illustrating the user interface of FIG. 5 after the rating is generated according to an embodiment of the invention. After the user clicks on one of the star icons of the rating input UI element 542 for the "Fort Funston" rating list element 540A, in the depicted embodiment that rating list element 540A is removed from the rating portion 504. Accordingly, the second and third rating list elements 540B and 540C from FIG. 5 are moved up to become the first and second rating list elements 540B and 540C in FIG. 6. Additionally, a new rating list element 540D is added (for the "Golden Gate Bridge" location) that represents another of the seven locations that the social networking system determined that the user has visited. Also, in an embodiment, the rating status indicator 604 is updated to "1/7" to indicate that one of the seven determined-visited locations has been rated by the user.

In an embodiment of the invention, the geographic map area 607 is modified to indicate that the rating has been successfully entered. In one embodiment, the geographic map area 607 may be moved to include or be centered upon a position where the location identifier 602 is to be located for that rated location, which may include updating the ranked results portion 602 to include different result elements based upon the updated geographic map area 607. In some embodiments, the geographic map area 607 may be zoomed in (i.e., have a change of scale) upon the location identifier 602, which also may trigger an update to the ranked results portion 602 of the user interface 600. Additionally, in some embodiments, upon the user providing a rating for a location, an animation is displayed within the geographic map portion 506 to provide feedback to the user that the rating has been successfully entered. In an embodiment, this animation includes dropping a "pin" icon 604 from at or near the top of the geographic map portion 506 or user interface 600 to a position at or near the location identifier. This "dropping" animation is depicted within FIG. 6 using the thick black arrows to indicate motion; in most embodiments such arrows are not actually displayed.

Figure 7:
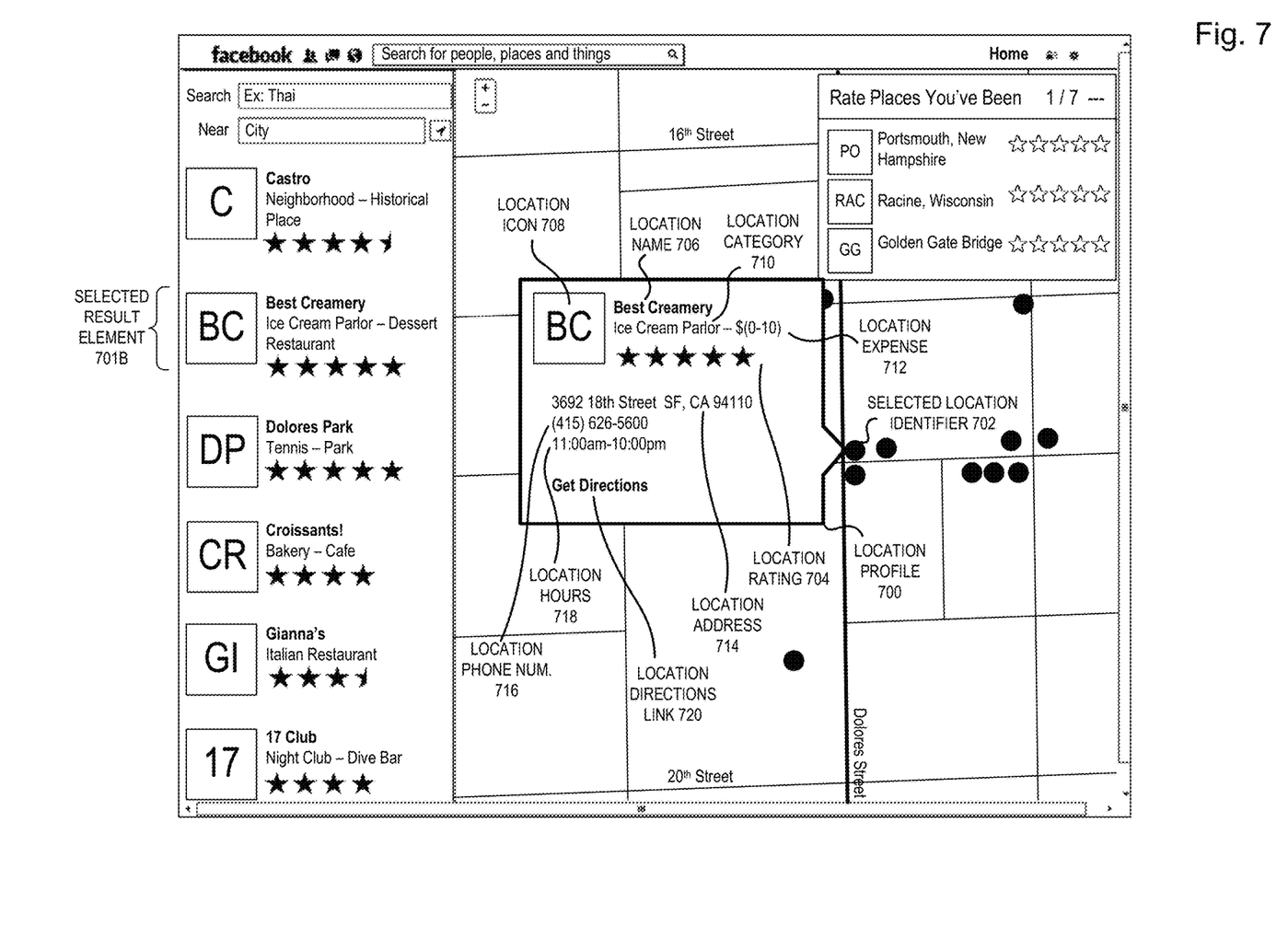
FIG. 7 is a diagram illustrating a location profile for a location identifier according to an embodiment of the invention.

FIG. 7 is a diagram illustrating a location profile 700 for a location identifier 702 according to an embodiment of the invention. In some embodiments of the invention, when the user selects a result element 701B (by, for example, clicking on the result element or location identifier), a location profile 700 is displayed to the user. This location profile 700 may include a wide variety of information related to the location, including but not limited to a location icon 708 (or photograph(s)), a location name 706, a location category 710 describing the type of location, a location expense 712 indicating a likely price range of goods and/or services offered at the location, a location rating 704 from a set of one or more users or the user herself, a location address 714 indicating a street address or other geographic-type address, a location phone number 716, and location hours 718 that indicate one or more times that the location is open or available. In an embodiment, the location profile 700 also includes a location directions link 720 allowing the user to select and follow the link to generate directions to the location. In some embodiments, the generated directions begin or end at a current, determined location of the user device of the user.

Figure 8:
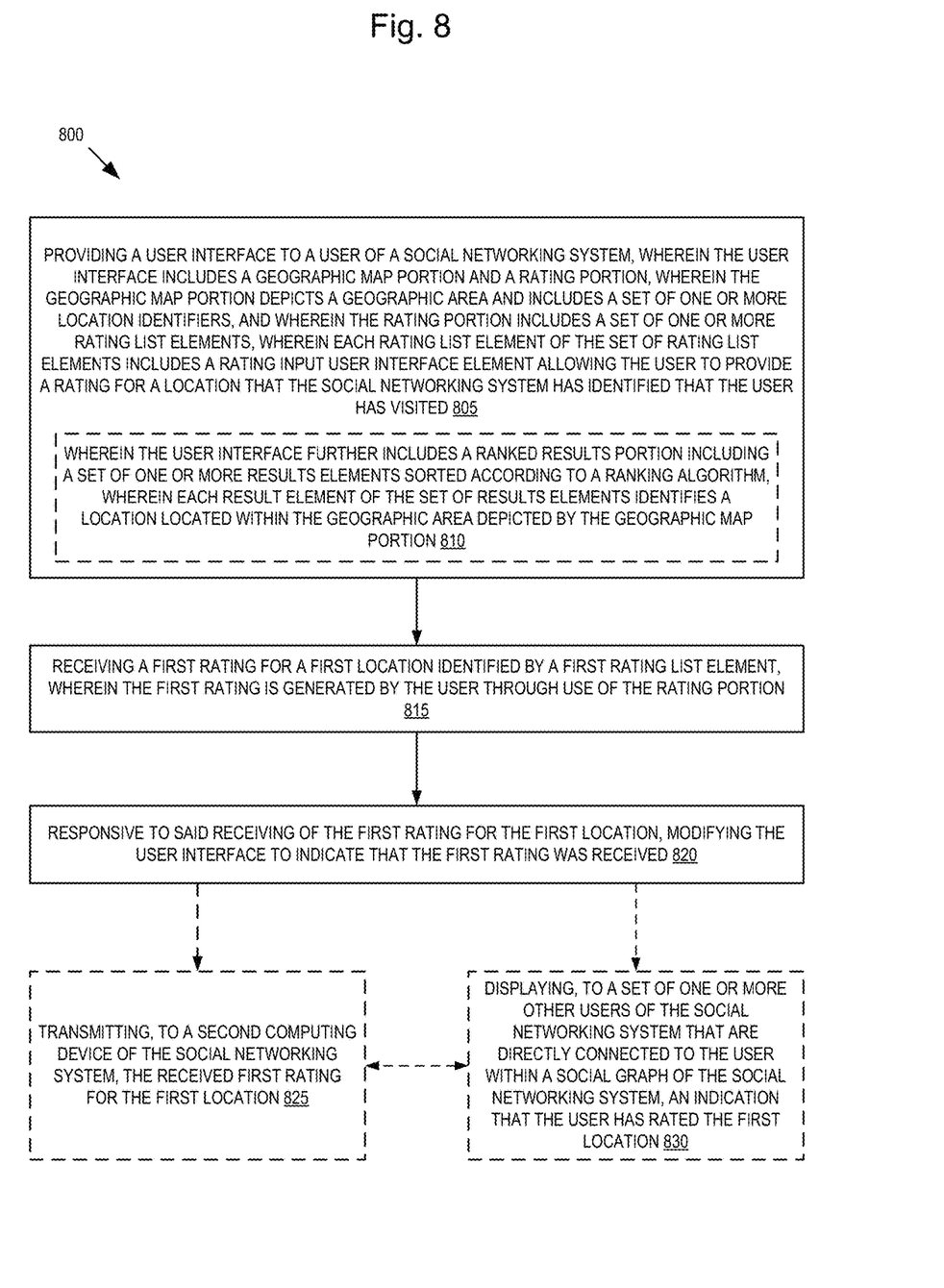
FIG. 8 is a diagram illustrating a flow for providing community-based map functionalities according to an embodiment of the invention.

FIG. 8 is a diagram illustrating a flow 800 for providing community-based map functionalities according to an embodiment of the invention. The flow 800 includes providing a user interface to a user of a social networking system 805. The user interface includes a geographic map portion that depicts a geographic area and includes a set of one or more location identifiers. The user interface also includes a rating portion that includes a set of one or more rating list elements. Each rating list element of the set of rating list elements includes a rating input user interface element that allows the user to provide a rating for a location that the social networking system has determined that the user has visited.

In an embodiment of the invention, the user interface further includes a ranked results portion that includes a set of one or more results elements sorted according to a ranking algorithm 810. Each result element of the set of results elements identifies a location located within the geographic area depicted by the geographic map portion. At 815, the flow includes receiving a first rating for a first location identified by a first rating list element. This first rating is generated by the user through use of the rating portion. Next, at 820, the flow includes—responsive to said receiving of the first rating for the first location—modifying the user interface to indicate that the first rating was received.

In some embodiments, the flow 800 also includes transmitting, to a second computing device of the social networking system, the received first rating for the first location 825. In some embodiments the flow also includes displaying, to a set of one or more other users of the social networking system that are directly connected to the user within a social graph of the social networking system, an indication that the user has rated the first location 830.

Figure 9:
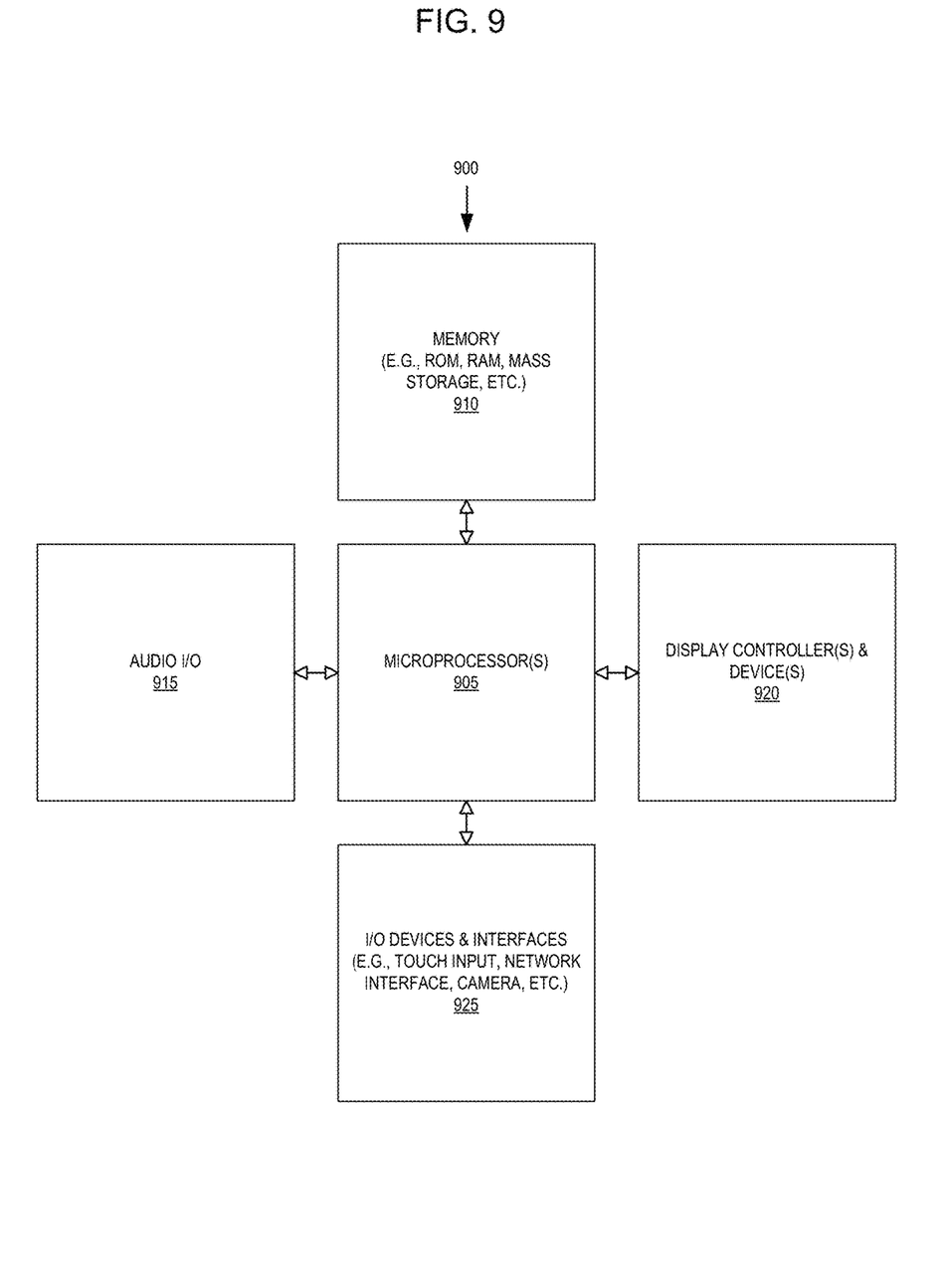
FIG. 9 illustrates a block diagram for an exemplary processing system to provide social network functionalities according to an embodiment of the invention.

FIG. 9 illustrates, in block diagram form, an exemplary data processing system 900 to provide social networking functionalities. Data processing system 900 includes one or more microprocessors 905 and connected system components (e.g., multiple connected chips). Alternatively, the data processing system 900 is a system on a chip.

The data processing system 900 includes memory 910, which is coupled to the microprocessor(s) 905. The memory 910 may be used for storing data, metadata, and programs for execution by the microprocessor(s) 905. The memory 910 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 910 may be internal or distributed memory.

The data processing system 900 also includes an audio input/output subsystem 915 which may include a microphone and/or a speaker for, for example, playing back music or other audio, receiving voice instructions to be executed by the microprocessor(s) 905, playing audio notifications, etc. A display controller and display device 920 provides a visual user interface for the user, e.g., GUI windows.

The data processing system 900 also includes one or more input or output ("I/O") devices and interfaces 925, which are provided to allow a user to provide input to, receive output from, and otherwise transfer data to and from the system. These I/O devices 925 may include a mouse, keypad or a keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 900.

The I/O devices and interfaces 925 may also include a connector for a dock or a connector for a USB interface, FireWire, Thunderbolt, Ethernet, etc. to connect the system 900 with another device, external component, or a network. Exemplary I/O devices and interfaces 925 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 900 with another device, external component, or a network and receive stored instructions, data, tokens, etc.

It will be appreciated that one or more buses may be used to interconnect the various components shown in FIG. 9.

The data processing system 900 is an exemplary representation of a client device 110, but any of these features may also be utilized by one or more devices implementing the social networking system 100. The data processing system 900 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, the data processing system 900 may be a network computer, server, or an embedded processing device within another device or consumer electronic product. As used herein, the terms computer, system, device, processing device, and "apparatus comprising a processing device" may be used interchangeably with the data processing system 900 and include the above-listed exemplary embodiments.

It will be appreciated that additional components, not shown, may also be part of the system 900, and, in certain embodiments, fewer components than that shown in FIG. 9 may also be used in a data processing system 900. It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 910 or other non-transitory machine-readable storage medium. The software may further be transmitted or received over a network (not shown) via a network interface device 925. In various embodiments, hardwired circuitry may be used in combination with the software instructions to implement the present embodiments. Thus, the techniques are not limited to any specific combination of hardware circuitry and software, or to any particular source for the instructions executed by the data processing system 900.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing a Field-Programmable Gate Array (FPGA), Application-Specific Integrated Circuit (ASIC), a processor, a computer, or a computer system including a network. Modules and components of hardware or software implementations can be divided or combined without significantly altering embodiments of the invention.

While these methods, systems, and user interfaces utilize both publicly available information as well as information provided by users of the social networking system, all use of such information is to be explicitly subject to all privacy settings of the involved users and the privacy policy of the social networking system as a whole.

In the foregoing specification, the invention has been described with reference to specific exemplary embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A method comprising:
   determining, by a communication system, a plurality of locations a user of the communication system has visited and has not rated;
   providing, by the communication system to a computing device associated with the user, a user interface, wherein the user interface includes a geographic map portion and a rating portion, wherein the geographic map portion depicts a geographic area and includes a set of one or more location identifiers, and wherein the rating portion includes a set of one or more rating list elements, wherein each rating list element of the set of rating list elements includes a rating input user interface element allowing the user to provide a rating for a location of the plurality of locations that the communication system determined that the user has visited and has not rated;
   receiving, from the user utilizing the user interface, a first rating for a first location identified by a first rating list element of the set of rating list elements, wherein the first rating is generated by the user through use of the rating portion of the user interface;
   determining a location type for the first location;
   determining the user is an expert within the communication system with regard to the location type based upon a number of locations the user has visited of the location type or based upon a number of ratings the user has provided for locations of the location type; and
   responsive to said receiving of the first rating for the first location, modifying the user interface to indicate that the first rating was received, wherein the first rating is weighted in response to determining the user is an expert with regard to the location type.

2. The method of claim 1, further comprising:
   transmitting, to a second computing device of the communication system, the received first rating for the first location.

3. The method of claim 1, further comprising:
   providing, to a set of one or more other users of the communication system that are directly connected to the user within a social graph of the communication system, an indication that the user has rated the first location.

4. The method of claim 1, wherein said modifying of the user interface comprises displaying an animation within the geographic map portion.

5. The method of claim 4, wherein the animation comprises moving a location identifier for the first location to a position in the geographic map portion.

6. The method of claim 1, wherein said modifying of the user interface comprises removing the first rating list element from the rating portion.

7. The method of claim 1, wherein the user interface further includes a ranked results portion including a set of one or more result elements sorted according to a ranking algorithm, wherein each result element of the set of result elements identifies a location located within the geographic area depicted by the geographic map portion.

8. The method of claim 7, wherein the ranking algorithm is based upon one or more of:
ratings submitted to the communication system by a first set of one or more other users of the communication system that are directly connected to the user within a social graph of the communication system; and
ratings submitted to the communication system by a second set of one or more other users of the communication system that are directly connected to the first set of other users within the social graph.

9. The method of claim 7, wherein the ranking algorithm is based upon a number of times that each location located within the geographic area has been rated by a set of one or more users of the communication system.

10. The method of claim 7, wherein the ranking algorithm utilizes a set of one or more ratings submitted to the communication system by a set of one or more other users of the communication system, wherein each rating of the set of ratings is weighted based upon a computed similarity value representing a similarity between ratings submitted by the other user that submitted the rating and ratings submitted by the user.

11. The method of claim 7, wherein the ranking algorithm utilizes a set of one or more ratings submitted to the communication system by a set of one or more other users of the communication system, wherein each rating of the set of ratings is weighted based upon a number of ratings that the other user that submitted the rating has submitted to the communication system.

12. The method of claim 1, wherein the geographic map portion further includes a set of one or more aggregate location identifiers, wherein each aggregate location identifier of the set of aggregate location identifiers represents a plurality of location identifiers.

13. The method of claim 1, wherein the geographic area is selected based upon a current geographic location of the user.

14. A set of one or more non-transitory computer-readable storage media that provides instructions that, when executed by a computing device, will cause said computing device to perform operations comprising:
determining, by a communication system, a plurality of locations a user of the communication system has visited and has not rated;
providing, by the communication system to a computing device associated with the user, a user interface, wherein the user interface includes a geographic map portion and a rating portion, wherein the geographic map portion depicts a geographic area and includes a set of one or more location identifiers, and wherein the rating portion includes a set of one or more rating list elements, wherein each rating list element of the set of rating list elements includes a rating input user interface element allowing the user to provide a rating for a location of the plurality of locations that the communication system has determined that the user has visited and has not rated;
receiving, from the user utilizing the user interface, a first rating for a first location identified by a first rating list element of the set of rating list elements, wherein the first rating is generated by the user through use of the rating portion of the user interface;
determining a location type for the first location;
determining the user is an expert within the communication system with regard to the location type based upon a number of locations the user has visited of the location type or based upon a number of ratings the user has provided for locations of the location type; and
responsive to said receiving of the first rating for the first location, modifying the user interface to indicate that the first rating was received, wherein the first rating is weighted in response to determining the user is an expert with regard to the location type.

15. The set of non-transitory computer-readable storage media of claim 14, wherein the instructions cause said computing device to perform further operations comprising:
transmitting, to a second computing device of the communication system, the received first rating for the first location.

16. The set of non-transitory computer-readable storage media of claim 14, wherein the instructions cause said computing device to perform further operations comprising:
providing, to a set of one or more other users of the communication system that are directly connected to the user within a social graph of the communication system, an indication that the user has rated the first location.

17. The set of non-transitory computer-readable storage media of claim 14, wherein said modifying of the user interface comprises displaying an animation within the geographic map portion.

18. The set of non-transitory computer-readable storage media of claim 17, wherein the animation comprises moving a location identifier for the first location to a position in the geographic map portion.

19. The set of non-transitory computer-readable storage media of claim 14, wherein said modifying of the user interface comprises removing the first rating list element from the rating portion.

20. The set of non-transitory computer-readable storage media of claim 14, wherein the user interface further includes a ranked results portion including a set of one or more result elements sorted according to a ranking algorithm, wherein each result element of the set of result elements identifies a location located within the geographic area depicted by the geographic map portion.

21. The set of non-transitory computer-readable storage media of claim 20, wherein the ranking algorithm is based upon one or more of:
ratings submitted to the communication system by a first set of one or more other users of the communication system that are directly connected to the user within a social graph of the communication system; and
ratings submitted to the communication system by a second set of one or more other users of the communication system that are directly connected to the first set of other users within the social graph.

22. The set of non-transitory computer-readable storage media of claim 20, wherein the ranking algorithm is based upon a number of times that each location located within the geographic area has been rated by a set of one or more users of the communication system.

23. The set of non-transitory computer-readable storage media of claim 20, wherein the ranking algorithm utilizes a set of one or more ratings submitted to the communication system by a set of one or more other users of the communication system, wherein each rating of the set of ratings is weighted based upon a computed similarity value representing a similarity between ratings submitted by the other user that submitted the rating and ratings submitted by the user.

24. The set of non-transitory computer-readable storage media of claim 20, wherein the ranking algorithm utilizes a set of one or more ratings submitted to the communication system by a set of one or more other users of the communication system, wherein each rating of the set of ratings is weighted based upon a number of ratings that the other user that submitted the rating has submitted to the communication system.

25. The set of non-transitory computer-readable storage media of claim 14, wherein the geographic map portion further includes a set of one or more aggregate location identifiers, wherein each aggregate location identifier of the set of aggregate location identifiers represents a plurality of location identifiers.

26. The set of non-transitory computer-readable storage media of claim 14, wherein the geographic area is selected based upon a current geographic location of the user.

* * * * *